United States Patent
Strömberg

(10) Patent No.: US 7,236,093 B2
(45) Date of Patent: Jun. 26, 2007

(54) METHOD FOR THE MANUFACTURE OF A SMART LABEL INLET WEB, AND A SMART LABEL INLET WEB

(75) Inventor: Samuli Strömberg, Tampere (FI)

(73) Assignee: UPM Raflatac Oy (FI)

( * ) Notice: Subject to any disclaimer, the term of this patent is extended or adjusted under 35 U.S.C. 154(b) by 17 days.

(21) Appl. No.: 11/217,199

(22) Filed: Sep. 1, 2005

(65) Prior Publication Data

US 2006/0032577 A1    Feb. 16, 2006

Related U.S. Application Data

(63) Continuation of application No. 10/191,968, filed on Jul. 9, 2002, now abandoned, which is a continuation of application No. PCT/FI01/00037, filed on Jan. 16, 2001.

(30) Foreign Application Priority Data

Jan. 17, 2000   (FI)   ................................. 20000082

(51) Int. Cl.
    G08B 13/14    (2006.01)
(52) U.S. Cl. .............. 340/572.8; 340/572.1; 283/81
(58) Field of Classification Search ............ 340/572.1, 340/572.3, 572.8, 572.7; 283/67, 70, 81; 428/40.1, 40.9, 42.2; 427/503; 101/23, 101/28
    See application file for complete search history.

(56) References Cited

U.S. PATENT DOCUMENTS

| | | | |
|---|---|---|---|
| 3,628,977 A | 12/1971 | Deegan | |
| 4,288,499 A | 9/1981 | Kielbania, Jr. | |
| 4,443,491 A * | 4/1984 | McIntyre | ...................... 427/503 |
| 4,841,712 A | 6/1989 | Roou | |
| 4,897,534 A | 1/1990 | Haghiri-Tehrani | |
| 4,977,006 A * | 12/1990 | Smith et al. | ................ 428/42.2 |
| 5,201,976 A * | 4/1993 | Eastin | ......................... 156/152 |
| 5,344,808 A | 9/1994 | Watanabe et al. | |
| 5,534,372 A | 7/1996 | Koshizuka et al. | |
| 5,667,541 A | 9/1997 | Klun et al. | |
| 5,759,683 A | 6/1998 | Boswell | |
| 5,822,194 A | 10/1998 | Horiba et al. | |
| 5,852,289 A | 12/1998 | Masahiko | |
| 5,963,134 A | 10/1999 | Bowers et al. | |
| 5,976,690 A | 11/1999 | Williams et al. | |
| 6,012,641 A | 1/2000 | Watada | |
| 6,070,803 A | 6/2000 | Stobbe | |

(Continued)

FOREIGN PATENT DOCUMENTS

JP    05155191    6/1993

(Continued)

*Primary Examiner*—Van T. Trieu
(74) *Attorney, Agent, or Firm*—Fitch, Even, Tabin & Flannery

(57) ABSTRACT

The invention relates to a method for the manufacture of a smart label inlet web, in which method a smart label is protected from external effects with a surface film coated with an adhesive, the adhesive being in contact with the smart label. The adhesive is cured by radiation. The invention also relates to a smart label inlet web comprising a surface film, a smart label and a back web attached to each other. The surface film is attached to the smart label with an adhesive cured by radiation.

25 Claims, 3 Drawing Sheets

U.S. PATENT DOCUMENTS

| | | |
|---|---|---|
| 6,090,484 A | 7/2000 | Bergerson |
| 6,107,920 A | 8/2000 | Eberhardt et al. |
| 6,147,662 A | 11/2000 | Grabau et al. |
| 6,177,859 B1 | 1/2001 | Tuttle et al. |
| 6,180,256 B1 | 1/2001 | Sargeant |
| 6,204,764 B1 | 3/2001 | Maloney |
| 6,232,870 B1 | 5/2001 | Garber et al. |
| 6,358,588 B1 * | 3/2002 | Edwards et al. ............ 428/42.2 |
| 6,365,546 B1 | 4/2002 | Kometani |
| 6,432,235 B1 | 8/2002 | Bleckmann et al. |
| 6,446,874 B1 | 9/2002 | Elbaz et al. |
| 6,451,154 B1 | 9/2002 | Grabau et al. |
| 6,497,371 B2 | 12/2002 | Kayanakis et al. |
| 6,520,544 B1 * | 2/2003 | Mitchell et al. ............... 283/70 |
| 6,522,549 B2 | 2/2003 | Kano et al. |
| 6,555,213 B1 | 4/2003 | Koneripalli et al. |
| 6,600,418 B2 | 7/2003 | Francis et al. |
| 6,607,834 B2 | 8/2003 | Davis et al. |
| 6,609,728 B1 | 8/2003 | Voerman et al. |
| 6,694,872 B1 * | 2/2004 | LaBelle et al. ................ 101/23 |
| 6,853,286 B2 | 2/2005 | Nikawa et al. |
| 6,644,551 B2 | 11/2005 | Clayman et al. |
| 2005/0087607 A1 | 4/2005 | Stromberg |

FOREIGN PATENT DOCUMENTS

| | | |
|---|---|---|
| JP | 05169843 | 7/1993 |

* cited by examiner

METHOD FOR THE MANUFACTURE OF A SMART LABEL INLET WEB, AND A SMART LABEL INLET WEB

This application is a continuation of U.S. application Ser. No. 10/191,968, filed Jul. 9, 2002 now abandoned which is a continuation of International Application No. PCT/FI01/00037, filed Jan. 16, 2001 which claims the benefit of Finnish Application No. FI20000082, filed Jan. 17, 2000.

FIELD

The present invention relates to a method for the manufacture of a smart label inlet web, a smart label inlet web, and a smart label card. A smart label inlet web comprises successive smart labels suitably spaced in a continuous sequence on a back web. The smart label inlet web is normally used as a raw material for further processing in the manufacture of a smart label product. At the stage of further processing e.g. by a printing machine, the smart label inlet web is introduced between a facing paper and a back paper for a label, before the ready labels are punched off the web.

BACKGROUND

In the present application, smart labels refer to labels comprising an RF-ID circuit (identification) or an RF-EAS circuit (electronic article surveillance). In this Finnish application, the English terms corresponding to the Finnish terms are often included in parenthesis, because the English terms are regularly used by persons skilled in the art.

A known smart label inlet web is disclosed in U.S. Pat. publication No. 5,867,102. In the publication, FIG. 15 shows a smart label inlet web comprising electronic product control means 240 having an adhesive background and comprising a thin film and an oscillating circuit protected by a small plastic cover.

The manufacture of the smart label inlet web involves several problems. Discharges of static electricity during the manufacturing process or moisture, particularly in a long term, may damage a smart label having no protection so that it becomes useless. When a suitable protection, for example a plastic film or paper, is attached with a conventional adhesive onto the smart label, it is relatively easy to detach, and the smart label can thus be easily damaged. Conventional wet lamination processes and direct application of a hot-melt adhesive on the smart label are poorly suited alternatives, because the smart label is subjected to mechanical stress and heat stress in these processes. In the process, waste is also produced especially at the beginning of the manufacturing process particularly when wet lamination is used, because the production parameters are usually not successfully set at once.

SUMMARY

The smart label may comprise a silicon chip with an integrated circuit attached on its surface. The chip, whose thickness is typically more than 50 µm, forms a bulge on the surface of the smart label, which is a problem e.g. at the stages of further processing, because the profile of the smart label is uneven. The above-mentioned problems can be reduced by the method according to claim 1, which is characterized in that the adhesive is cured by radiation. The smart label inlet web according to the invention is characterized in that the surface film is attached to the smart label with an adhesive cured by radiation. The smart label card according to the invention is characterized in that the surface film is attached to the smart label with an adhesive cured by radiation.

The chip is brittle and may be damaged, if there are angles with a small radius in the manufacturing process and/or if the smart label is pressed with a too hard compression load for example in a hard nip. These problems can be reduced by the method presented in the dependent claims 5 and 6.

The blank for a smart label inlet web comprises a back web, a smart label web and a surface web which are uniformly continuous and are attached to each other. In the ready smart label inlet web, the back web is uniformly continuous, but the surface web and the smart label web are punched into pieces separated from each other and having a fixed size. In this application, these pieces are referred to as the cover film and the smart label. It is also possible that the blank for a smart label inlet web is punched into pieces, separated from each other and having a fixed size, in such a way that the back web is also punched. In this way, smart label cards are formed.

The surface of the back web, which may be for example a release paper with a silicon coating, is provided with an adhesive. The adhesive can be any adhesive that is suitable for the purpose, for example a pressure-sensitive adhesive (PSA) which is easily adhered at room temperature.

The smart label web is a carrier web containing smart labels one after each other. The smart label web can be for example a plastic film. The smart label can be made either by etching the required conductive circuit in a metal or by pressing the required conductive circuit with an electro conductive ink on the smart label web. The electrically operating radio frequency identification (RFID) circuit of the smart label is a simple electric oscillating circuit (RCL circuit) operating at a defined frequency. The circuit consists of a coil, a capacitor and an integrated circuit on a chip. The integrated circuit comprises an escort memory and an RF part which is arranged to communicate with a reader device. Also the capacitor of the RCL circuit can be integrated on the chip.

The surface web is a film provided with an adhesive, such as a hot-melt adhesive, on its lower surface, i.e. on the side of the smart label. The hot-melt adhesive is preferably curable by radiation, wherein the adherence of the adhesive can be controlled by controlling the quantity of the radiation dose. Suitable methods for curing by radiation include curing by ultraviolet radiation or curing by an electron beam. The surface web is a plastic film, preferably a polyolefine film, such as a polypropylene or polyethylene film.

The back web, the smart label web and the surface web are attached to each other by introducing them simultaneously into a nip which can be for example a nip formed by two rolls or a nip formed by a roll and a belt. The adhesive of the back web adheres to the lower surface of the smart label web, and the adhesive of the surface web adheres to the upper surface of the smart label web. Before the nip, the adhesive can be suitably heated e.g. with an infrared heater, to provide the adhesive with suitable properties of adhesion to the smart label web. At least one of the contact surfaces forming the nip, such as rolls or belts, has a resilient surface, wherein a long nip is formed. The smart label inlet web formed by the attached webs is led to radiation, wherein the adhesive is finally cross-linked. After this, the smart label web and the surface web are punched into a smart label and a surface film of a fixed size. The material left over from the webs is removed from the surface of the back web, and the ready smart label inlet web is reeled up. In some applications, it is also possible to punch the back web into back films of fixed size, wherein smart label cards are formed, whose back film remains in its position in the ready product.

The surface web protects the smart label web from external effects. The surface web prevents damage to the electrical properties of the circuit caused by the effect of moisture or mechanically. It also protects the integrated circuit on the chip as well as its attachment from ambient factors, mechanical stress and discharges of static electricity. All the above-mentioned phenomena may completely break the circuit or impair its efficiency. A chip can be attached to each smart label of the smart label web for example by a so-called flip-chip technique, known as such.

The adhesive to be applied to the interface of the surface film and the smart label is an important factor in how successfully the smart label is protected from external effects. The hydrofobic/hydrophilic properties of the adhesive and the change of the mechanical properties by the effect of moisture must be taken into account. Particularly suitable adhesives for this purpose include, thanks to their slight absorption of moisture, hot-melt adhesives, particularly adhesives which can be cross-linked by UV radiation or electron beam curing and which can be transfer laminated. The adhesive layer formed on the release web of the surface web is transfer laminated, and after this, the polymer is cross-linked further. Cross-linking can be controlled by adjusting the energy supplied to the system. It is possible to use UV hot-melt adhesives, whose cross-linking can be adjusted by adjusting the quantity of the UV radiation. The radiation requires a protective film passing UV radiation, wherein for example polyethylene and polypropylene films are well suited for the purpose. It is also possible to cure the adhesive by electron beam (EB) curing, wherein it is possible to use a range of films with a larger material basis than when UV radiation is used, because in this case the film does not need to pass UV radiation. When curing by an electron beam is used, the penetration depth must be suitably selected so that it will not affect the functional properties of the chip. When using an adhesive that is cross-linked by radiation, the web does not need to be subjected to a hard pressure in the nip upon attaching the webs, because the adhesion of the adhesive can be improved by cross-linking after the nip.

It is also possible that the smart label web is laminated between the surface and back webs in such a way that the back web is not intended to be removed at a stage of further processing, but it is punched into a back film having a fixed size and remaining in its position also in the final product. In this way, a card is formed which can be used e.g. as a disposable charge card, such as a ticket or a charge card for a bus. Such a card can also be used as a product control means, for example sewn or heat-sealed inside a garment. The surface and back webs of such cards can be made of for example plastic, paper or board. In cases in which the material does not pass UV radiation, a suitable curing method is curing by an electron beam. In these uses, properties that can be required of the surface and back webs include suitability for heat sealing, rigidity, and good mechanical, optical and visual properties.

The speed used in the process of manufacturing the smart label inlet web is relatively slow, wherein a good result is obtained with a long nip time in a soft and long nip. The long nip can be formed for example between two rolls or between a roll and a resilient belt. In a nip formed by two rolls, at least one of the rolls has a resilient surface, wherein at least part of the material of the roll can be of an elastomer. It is also possible that both of the rolls forming the nip have a resilient surface. The tension of the back and surface webs is adjusted by methods known as such, but the smart label web is slack when it is led to lamination. By simultaneous lamination of the surface web and the back web, the risk of breaking the smart label is reduced, when it is run only once through the nip in the lamination process. Similarly, by using a long, soft nip, the risk of breaking is reduced, when the smart label is subjected to a low surface pressure when compared with using a hard nip. Furthermore, the path of the smart label is more straight in a soft nip than in a hard nip which may easily have quickly turning angles.

In further processing, the smart label inlet web is introduced between the surface and back webs in the process, and after that, the ready labels are possibly punched off the web, wherein separate smart label products are formed. In further processing, the labels can be printed, wherein for achieving a good printing result, the profile of the smart label product must be even. Problems in the smoothness are particularly caused by the chip of the smart label which forms a clear bulge on the surface of the smart label product. The bulge can be made smaller by trying to remove the adhesive layer of the surface web from the surface of the chip. A hot-melt adhesive, which is either a hot-melt adhesive cured by radiation, such as ultraviolet radiation or an electron beam, or a normal hot-melt adhesive that can be made fluid by heating, can be made to run off the surface of the chip. A hot-melt adhesive curable by ultraviolet radiation or by an electron beam can be left fluid upon the lamination of the surface web, wherein no additional heating is necessary.

BRIEF DESCRIPTION OF THE DRAWINGS

In the following, the invention will be described with reference to the appended drawings, in which.

DETAILED DESCRIPTION

Figure 1:
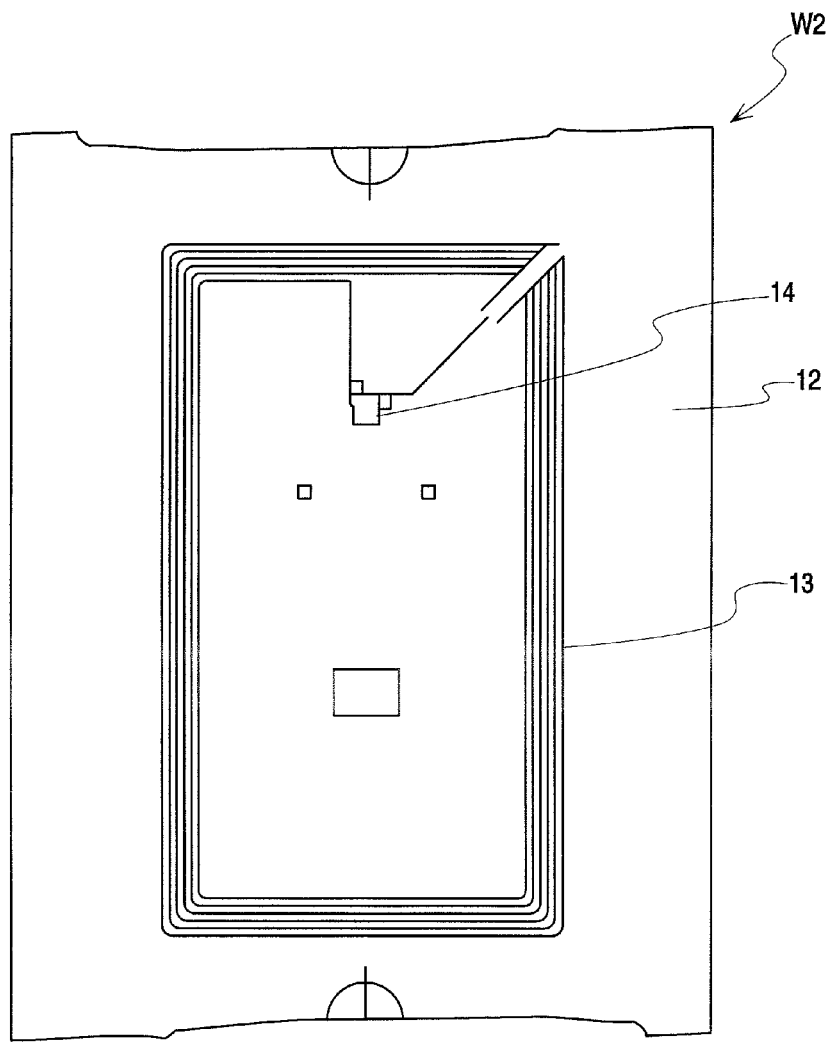
FIG. 1 shows a smart label web in a top view.

FIG. 1 shows a smart label web W2 in a top view, including a single smart label 12 comprising a circuitry pattern 13 and an integrated circuit 14 therein. The smart label 12 can be manufactured by pressing the circuitry pattern on a film with an electroconductive printing ink or by etching the circuitry pattern on a metal film. The circuitry pattern is provided with an identification circuit, such as a radio frequency identification (RFID) circuit. The identification circuit is a simple electric oscillating circuit (RCL circuit) tuned to operate at a defined frequency. The circuit consists of a coil, a capacitor and a circuit integrated on a chip, consisting of an escort memory and an RF part for communication with a reader device. The capacitor of the RCL circuit can also be integrated on the chip.

Figure 2:
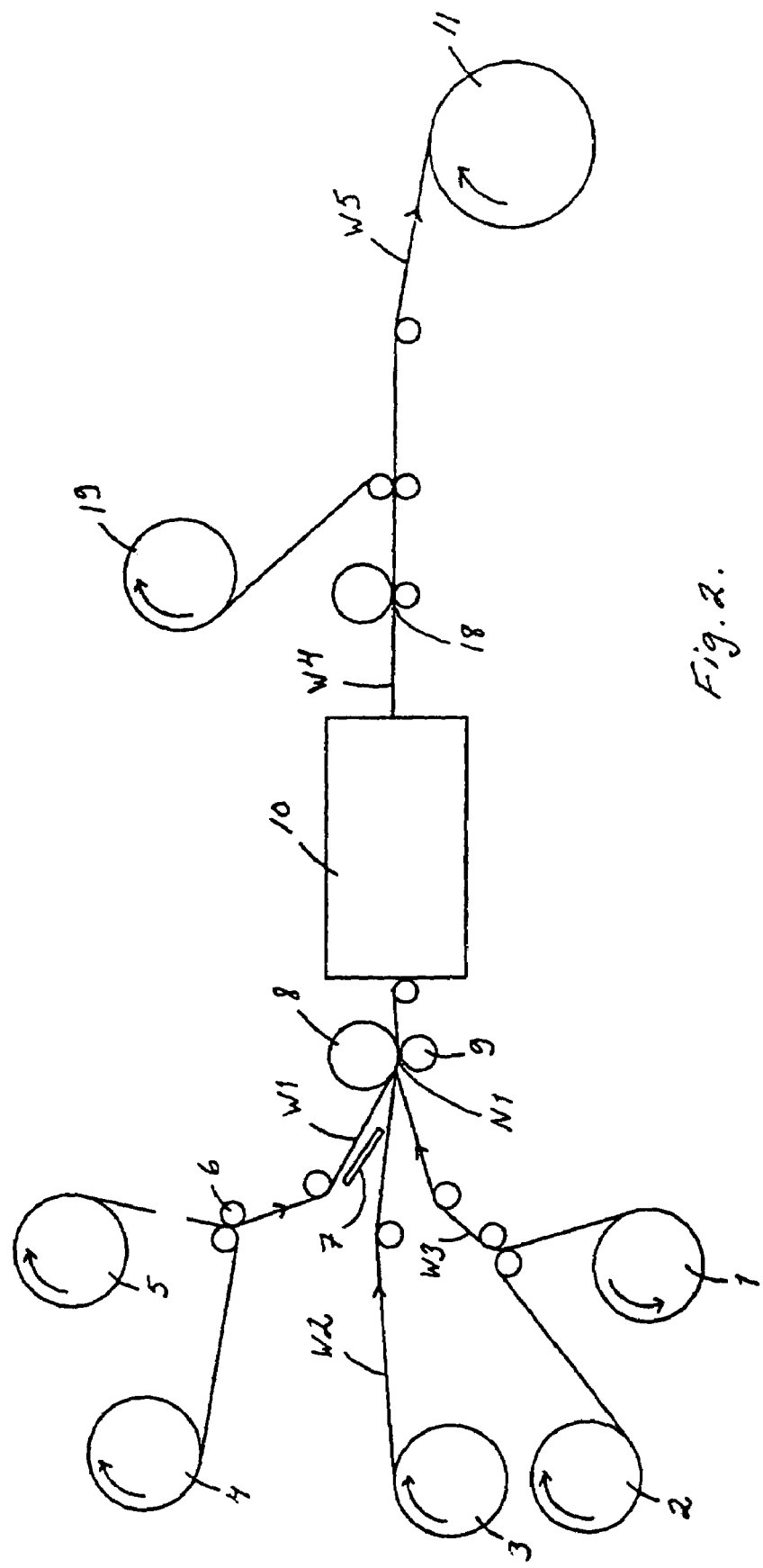
FIG. 2 shows the process of manufacturing a smart label inlet web in a schematic view.

FIG. 2 shows the process of manufacturing a smart label inlet web. A continuous web comprising a surface web W1 is unwound from a reel 5. From the reverse side of the surface web W1, the release web of the surface web is released and, after the releasing, it is reeled up on a roll 4. On the side where the release web was released, the surface web W1 is impregnated with an adhesive whose adhesion can be improved by heating it with a heater 7 which can be for example an infrared heater. The material of the surface web W1 is preferably a polyolefine film, such as a polypropylene or polyethylene film.

The smart label web W2 containing smart labels 12 one after another on a carrier web, is unwound from a reel 3. The carrier web may also contain several smart labels side by side. The material of the smart label web W2, onto whose surface the circuitry pattern is formed and the integrated circuit is attached, is preferably a plastic film with a suitable rigidity.

A continuous web comprising a back web W3 is unwound from a reel 1. From the reverse side of the back web W3, the release web of the back web is released and, after the releasing, it is reeled up on a roll 2. On the side where the release web was released, the back web W3 is provided with an adhesive. The adhesive can be for example a pressure-sensitive adhesive which can be made to adhere to another surface by pressing it against the other surface.

The surface web W1, the smart label web W2 and the back web W3 are attached to each other in a nip N1 formed by rolls 8 and 9, which is a resilient, long nip. The nip N1 is followed by a radiator device 10 to which the blank W4 of the smart label inlet web is led. The radiator device 10 can produce ultraviolet radiation or electron beams. The blank W4 of the smart label inlet web is further introduced to a punching unit 18 in which the surface web W1 and the smart label web W2 are punched at a suitable location so that the surface of the back web W3 is provided with a sequence of smart labels 12 of a fixed size and protective surface films 15 on top of them. After the punching, excess parts of the surface web W1 and the smart label web W3 are left outside the smart label 12 and the surface film 15 and are removed by reeling up the excess material on a reel 19. The ready made smart label inlet web W5 is reeled up on a reel 11.

Figure 3:
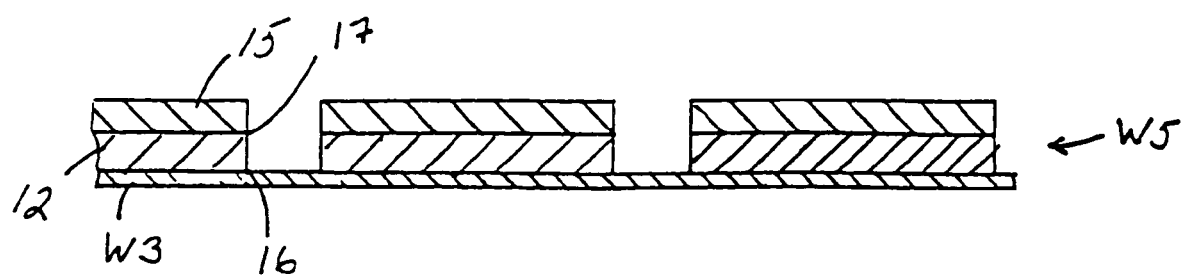
FIG. 3 shows a side view of the ready smart label inlet web.

FIG. 3 shows the cross-section of the ready smart label inlet web in the longitudinal direction of the web. The back web W3 is a continuous carrier web for the smart label 12 under the surface film 15. The surface web W1 and the smart label web P12 are punched as a cover film 15 and a smart label 12. The excess parts of the surface web W1 and the smart label web W2 left at the edges upon punching are removed from the back web W3. The interface 16 between the back web W3 and the smart label 12 is provided with an adhesive layer which can be for example a pressure-sensitive adhesive. The inter-face 17 between the smart label 12 and the cover film 15 is provided with an adhesive layer which is preferably a hot-melt adhesive cured by means of ultraviolet (UV) radiation or an electron beam (EB).

The back web W3 is a release paper whose surface on the side of the smart label 12 is treated in such a way that the smart label 12 and the cover film 15 can be easily detached together from the back web W3 at the interface 16. The cover film 15 is a film passing UV radiation, such as a polyolefine film.

EXAMPLE

A hot-melt adhesive curable by ultraviolet radiation (acResin A 258 UV, BASF AG, Germany) and a conventional adhesive were used in a comparison test on the attachment of synthetic films. Samples were drawn with a tension device (Instron) at the angle of 180° at the speed of 300 mm/min, and the withdrawal force was measured. The force required for the detachment (peel value) was the following for the different adhesives (average of the measurements):

Conventional adhesive 16 N/48 mm
Adhesive cured by ultraviolet radiation 22 N/48 mm It is seen from the results that the adhesive curable by ultraviolet radiation yields an increase of about 37% when compared with the conventional adhesive.

The invention is not restricted to the description above, but it may vary within the scope of the claims. The method according to the invention can be used in all suitable uses where a protection is required for the smart label. The smart label inlet web does not necessarily need to be ready in the form of a continuous web, but single smart labels can be fed with a suitable feeding device. The blank of the smart label inlet web can be punched into smart label cards which comprise a film on both sides of the smart label, no adhesive being normally applied on the outer surface of the films. The main idea in the present invention is that by using an adhesive of a particular type, it is possible to protect the properties of the smart label and thus to improve the quality and reliability of the manufacture.

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A smart label web product comprising:
   a surface web;
   a smart label which includes an integrated circuit and antenna on a top surface of a polymeric carrier film, the top surface of the carrier film, the integrated circuit and antenna overlaid with a smart label over film, the carrier film having an underside surface opposite the top surface carrying the integrated circuit and antenna; and
   a back web, the over film attached to the top surface of the carrier film by a radiation cured adhesive, the surface web attached to and over the over film of the smart label, and the back web attached to the underside surface of the carrier film.

2. The smart label web according to claim 1, wherein the adhesive is an ultraviolet radiation cured or electron beam cured adhesive curing.

3. A smart label card comprising:
   a surface web:
   a smart label which includes an integrated circuit and antenna on a top surface of a polymeric carrier film, the top surface of the carrier film, the integrated circuit and antenna overlaid with a smart label over film, the carrier film having an underside surface opposite the top surface carrying the integrated circuit and antenna; and
   a back web, the over film attached to the top surface of the carrier film by a radiation cured adhesive the surface web attached to and over the over film of the smart label, and the back web attached to the underside surface of the carrier film.

4. The smart label card according to claim 3, wherein the adhesive is an ultraviolet radiation cured or electron beam cured adhesive.

5. A method for manufacturing a smart label web product including smart labels which each comprise a circuitry pattern and an integrated circuit, the method comprising:
   making a smart label inlet web in web form;
   separating single smart labels from the smart label inlet web; and
   introducing the single smart labels between a surface web and a back web to form the smart label web product.

6. The method according to claim 5 wherein the smart label web product which is formed from the surface web and the back web, is printed.

7. A smart label web product made according to the method of claim 5.

8. A smart label web product including smart labels each of which include an integrated circuit and antenna on a top surface of a polymeric carrier film, in such a manner that the smart labels, which are separated from each other, are located sequentially between a paper surface web and a paper back web.

9. A method for making a smart label web product, the method comprising:
   providing a carrier web with a plurality of circuitry patterns and integrated circuits on a top surface of the carrier web, each circuitry pattern being electrically connected to an integrated circuit;
   applying a first surface web to the top surface of the carrier web with the circuitry patterns and integrated circuits to provide a smart label inlet web;
   cutting smart labels from the smart label inlet web to provide a plurality of separate smart labels; and
   feeding the separate smart labels between a second surface web and a back web to form the smart label web product.

10. The method according to claim 9, the method further comprising printing the second surface web.

11. The method according to claim 9, the method further comprising printing the back web.

12. The method according to claim 9 wherein the second surface web is paper.

13. The method according to claim 12 wherein the back web is paper.

14. The method according to claim 9 wherein the back web is paper.

15. A smart label web product made according to the method of claim 9.

16. The method according to claim 9 further comprising transfer laminating an uncured radiation curable adhesive to the first surface web and applying first surface web to the top surface of the carrier web through the transfer laminated adhesive on the first surface web to provide a smart label inlet web and radiation curing the uncured adhesive to provide the smart label inlet web.

17. A method for making a smart label web product, the method comprising:
   providing a carrier web with a plurality of circuitry patterns and integrated circuits on a top surface of the carrier web, each circuitry pattern being electrically connected to an integrated circuit;
   applying a first surface web to the top surface of the carrier web with the circuitry pattern and integrated circuits to provide a smart label inlet web;
   applying a back web to a back surface of the carrier web to provide a smart label inlet web blank;
   cutting smart labels from the smart label inlet web blank to provide a plurality of smart labels; and
   feeding individual smart labels between a second surface web and a second back web to form a smart label web product.

18. The method according to claim 17 wherein the second surface web is paper.

19. The method according to claim 18 wherein the back web is paper.

20. The method according to claim 17 wherein the back web is paper.

21. The method according to claim 17 further comprising transfer laminating an uncured radiation curable adhesive to the first surface web and applying first surface web to the top surface of the carrier web through the transfer laminated adhesive on the first surface web to provide a smart label inlet web and radiation curing the uncured adhesive to provide the smart label inlet web.

22. A method for the manufacture of a smart label web product, the method comprising:
   providing a carrier web with a plurality of circuitry patterns and integrated circuits on a surface of the carrier web, each circuitry pattern being electrically connected to an integrated circuit;
   providing a release lined surface web comprising a surface web and a surface web release liner adhesively affixed to the surface web with an uncured adhesive;
   removing the surface web release liner from the surface web and transfer laminating the adhesive from the surface web release liner to the surface web;
   laminating the surface web and the carrier web with the plurality of circuitry patterns and integrated circuits such that the surface of the surface web with the uncured adhesive overlies the plurality of circuitry patterns and integrated circuits;
   curing the uncured adhesive to provide a smart label inlet web;
   cutting smart labels from the smart label inlet web to provide a plurality of separate smart labels; and
   feeding the separate smart labels between a second surface web and a back web to form the smart label web product.

23. The method according to claim 22 wherein the uncured adhesive is radiation curable and the method further comprises irradiating the uncured adhesive with ultraviolet radiation or electron beam radiation.

24. A method for the manufacture of a smart label web product, the method comprising:
   providing a carrier web with a plurality of circuitry patterns and integrated circuits on a top surface of the carrier web, each circuitry pattern being electrically connected to an integrated circuit;
   providing a release lined surface web comprising a surface web and a surface web release liner adhesively affixed to the surface web with an uncured adhesive;
   removing the surface web release liner from the surface web and transfer laminating the adhesive from the surface web release liner to the surface web;
   applying back surface adhesive to a top surface of a back web;
   laminating the surface web, carrier web with the plurality of circuitry patterns and integrated circuits and the back web such that the surface of the surface web with the uncured adhesive overlies the plurality of the circuitry patterns and integrated circuits and the adhesive on the back web joins the surface of the back web with the surface of the carrier web which is opposite the surface of the surface of the carrier web which holds the circuitry patterns and integrated circuits to provide a laminated web;
   curing the uncured adhesive in the laminated web to provide a smart label inlet web blank;
   cutting smart labels from the smart label inlet web blank to provide a plurality of separate smart labels; and
   feeding the separate smart labels between a second surface web and a back web to form the smart label web product.

25. The method according to claim 24 wherein the uncured adhesive is radiation curable and the method further comprises irradiating the uncured adhesive with ultraviolet radiation or electron beam radiation.

* * * * *